United States Patent [19]

Matsubara

[11] Patent Number: 5,569,903
[45] Date of Patent: Oct. 29, 1996

[54] NON-CONTACT IC CARD

[75] Inventor: Toshiyuki Matsubara, Itami, Japan

[73] Assignee: Mitsubishi Denki Kabushiki Kaisha, Tokyo, Japan

[21] Appl. No.: 267,374

[22] Filed: Jun. 29, 1994

[30] Foreign Application Priority Data

Jul. 5, 1993 [JP] Japan .................................. 5-165689

[51] Int. Cl.⁶ .............................................. G06K 19/067
[52] U.S. Cl. ............................. 235/492; 235/493; 902/26
[58] Field of Search .................................. 235/492, 493, 235/380; 902/26

[56] References Cited

U.S. PATENT DOCUMENTS

| | | | |
|---|---|---|---|
| 4,372,699 | 2/1983 | Quinn, Jr. ................. | 400/625 |
| 4,692,601 | 9/1987 | Nakano ...................... | 235/380 |
| 4,800,255 | 1/1989 | Imran ....................... | 235/492 X |
| 5,068,521 | 11/1991 | Yamaguchi .................. | 235/492 |
| 5,105,074 | 4/1992 | Nara ......................... | 235/492 |
| 5,274,221 | 12/1993 | Matsubara .................. | 235/492 |

FOREIGN PATENT DOCUMENTS

| | | |
|---|---|---|
| 04054581 | 2/1992 | Japan . |
| 05290228 | 11/1993 | Japan . |
| 065161594 | 6/1994 | Japan . |

OTHER PUBLICATIONS

Nikkei Electronics, Sep. 1986, No. 44, pp. 133-144.
"Data Carrier", Chapter 5, pp. 101-106-no date.

*Primary Examiner*—Donald T. Hajec
*Assistant Examiner*—Jeffrey R. Filipek
*Attorney, Agent, or Firm*—Leydig, Voit & Mayer

[57] ABSTRACT

A contact type IC card includes a power supply terminal, a reset terminal and an input/output terminal connected to an external device, an input/output circuit for receiving data from and delivering data to an external device through the input/output terminal, a data processing circuit connected to the input/output circuit for processing data, a memory circuit connected to the data processing circuit for storing data, and an internal reset signal generator for latching a predetermined potential when source power is applied from the external device through the power supply terminal, generating an internal reset signal by using the latched potential to bring the circuits info reset states, and stopping generation of the internal reset signal to release the circuits from reset states when a reset release signal is input from the external device through the reset terminal. A non-contact type IC card includes, as specific parts, a transmitting/receiving circuit, a battery and an oscillation unit for stopping oscillation of a clock signal and starting the oscillation of a clock signal to supply the clock signal to the data processing circuit when a trigger signal is received through the transmitting/receiving circuit. A reset sequence is performed reliably and consumption of the battery is suppressed.

5 Claims, 11 Drawing Sheets

NON-CONTACT IC CARD

BACKGROUND OF THE INVENTION

1. Field of the Invention

The present invention relates to portable devices such as IC cards and, more particularly, to a contact type portable device which is connected to through connection terminals, and a non-contact type portable device which has a battery built therein as a power supply.

2. Description of the Related Art

Generally, a contact type IC card has a microcomputer for IC cards which is mounted in the card, and transfers data to and from an external terminal through connection terminals extending from the microcomputer to the card surface. In practice, the IC card is set in a reader/writer (not shown) and data is transferred to and from an external system under this condition.

Figure 16:
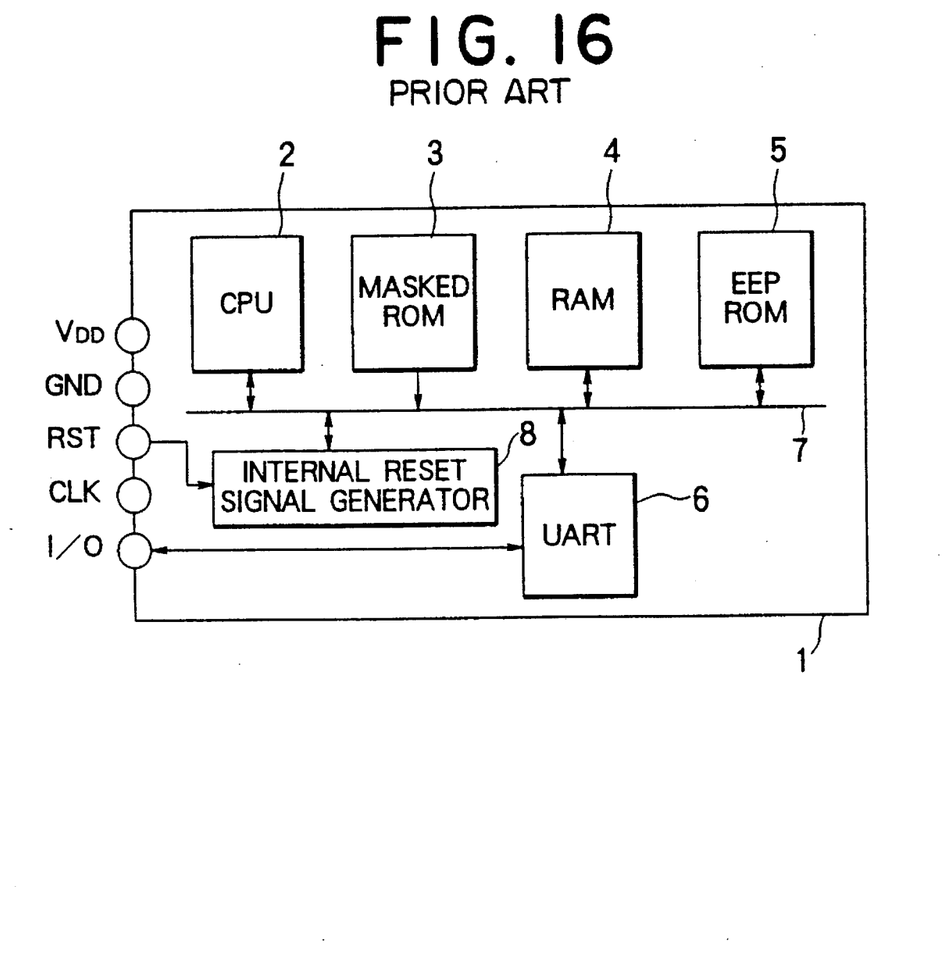
FIG. 16 is a block diagram of a conventional contact type IC card.

FIG. 16 is a functional block diagram of a conventional contact type IC card 1. The IC card 1 has five connection terminals, i.e., $V_{DD}$, GND, RST, CLK and I/O terminals. Data is serially transferred through the I/O terminals. Serial data input through the I/O terminal is subject to serial/parallel conversion in a UART 6, and then taken into a CPU 2 through a bus 7. The CPU 2 processes the data in accordance with the processing program loaded in a masked ROM 3 beforehand, loads the data, which is required to be stored temporarily, in a RAM 4, and loads the data such as processing results, which is required to be stored for a long period of time, in an EEPROM 5 as a data memory. The data which is output is subject to parallel/serial conversion in the UART 6, and then transferred to the exterior through the I/O terminal in series.

Figure 17:
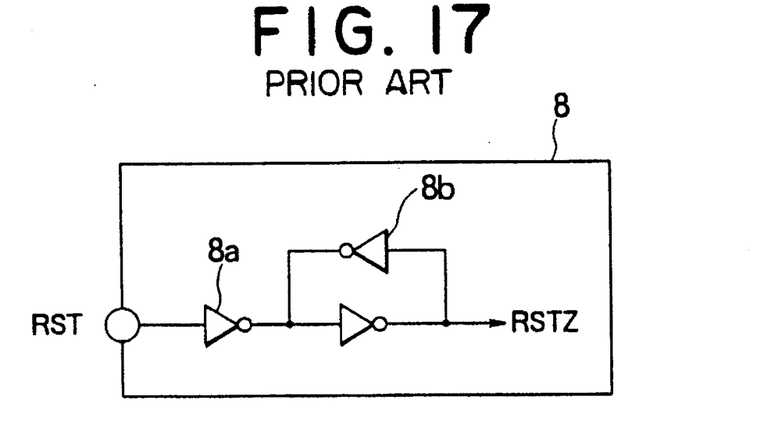
FIG. 17 is a logic circuit diagram of an internal reset signal generator for use in the IC card of FIG. 16.

The start-up operation of the IC card 1 will now be described. When the IC card 1 is set in the reader/writer, $V_{DD}$ and GND voltages are first supplied from the reader/writer to the IC card through the $V_{DD}$ and GND terminals, respectively. Then, a reset signal is input from the reader/writer to an internal reset signal generator 8 in the IC card 1 through the RST terminal. As shown in FIG. 17, the reset signal is inverted by an inverter 8a of the internal reset signal generator 8, latched by a latch 8b and then supplied as an internal reset signal RSTZ to the other circuits in the IC card 1. These circuits in the IC card 1 are thereby brought into reset states. Under this condition, a clock signal is started and supplied from the reader/writer through the CLK terminal. Then, after inverting the reset signal to release the reset states, usual data transfer and data processing are executed.

Figure 18:
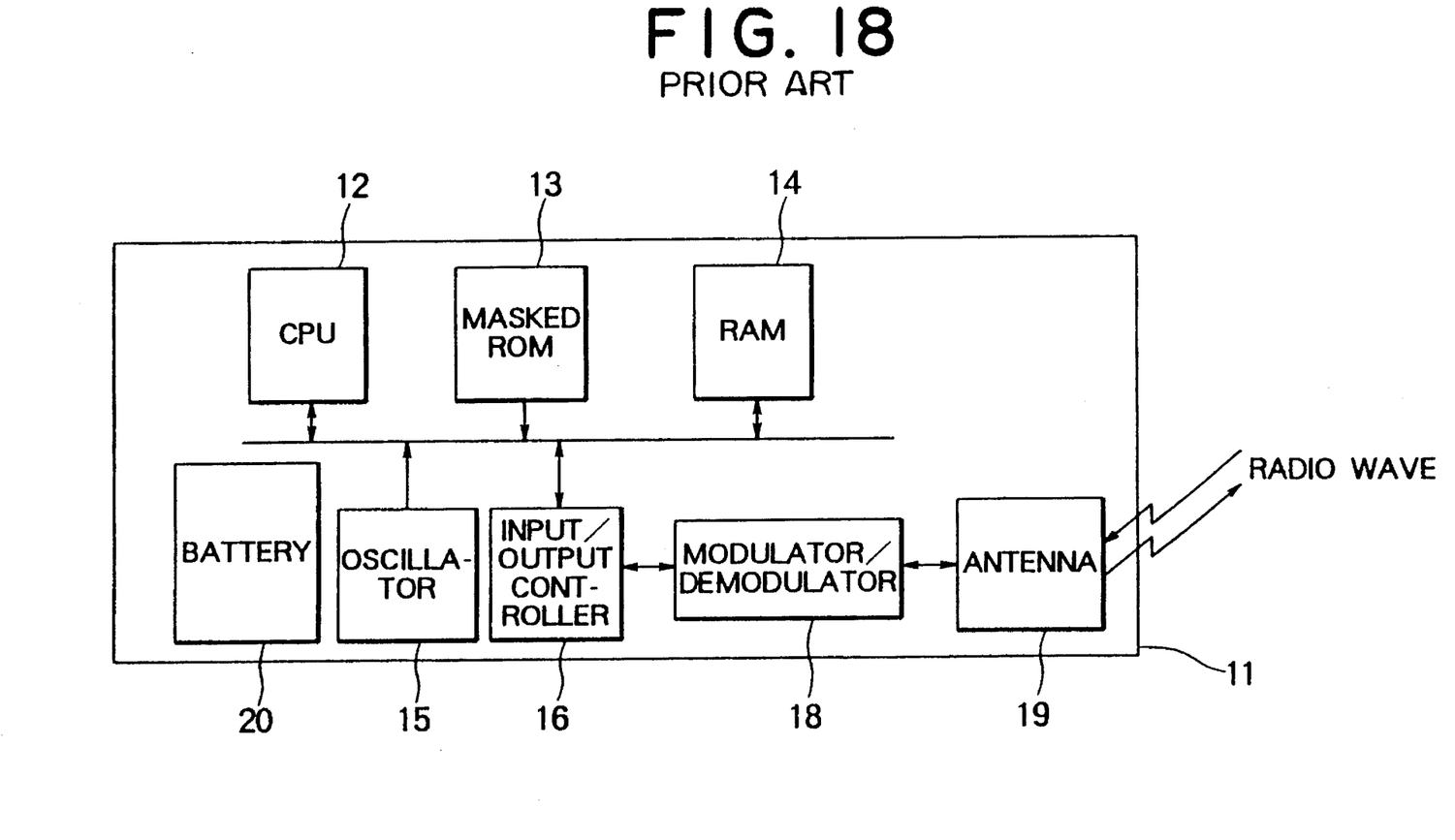
FIG. 18 is a block diagram of a conventional non-contact type IC card.

Next, a non-contact type IC card will be described with reference to FIG. 18. Unlike the contact type IC card 1 of FIG. 16, a non-contact type IC card 11 has no terminals for connection to an external terminal on its surface, and transfers data in a non-contact manner using radio waves or the like. The non-contact type IC card 11 executes data processing in a non-contact manner when a card user brings the card into the vicinity of a system device. A battery 20 as a power supply is built in the non-contact type IC card 11, and an oscillator 15 is started up with electric power supplied from the battery 20 for supplying a clock signal to all other parts in the card. When data is received by the card, an analog signal received through an antenna 19 is converted by a modulator/demodulator 18 into a digital signal which is delivered to an input/output controller 16. The digital signal delivered to the input/-output controller 16 is read by a CPU 12 through a bus. 17 and is processed in accordance with the processing program loaded in a masked ROM 13 beforehand. The data which is required to be stored is loaded into a RAM 14 by the CPU 12. On the other hand, when data is transmitted from the card, the data to be output is delivered to the modulator/demodulator 18 through the input/output controller 16 for conversion into an analog signal. The analog signal is then transmitted out of the card through the antenna 19.

In the conventional contact-type IC card 1, the input sequence of the reset signal is important because it is essential that the reset signal be supplied through the RST terminal upon application of the source power, and the card may malfunction if the reset signal is not surely input. Another problem in terms of integrity is that if the operation from application of the source power to supply of the reset signal and the clock signal does not progress as per the sequence when the card user sets the contact-type IC card 1 in the reader/writer, or if the terminals connected to the reader/writer have any connection failure, the data stored in the RAM 4 and the EEPROM 5 in the IC card 1 may be damaged.

Also, in the conventional contact-type IC card 1, the supply sequence of the reset signal upon application of the source power is important to ensure reliability of the IC card 1 because the IC card 1 is used for a variety of readers/writers and the reset signal is supplied from each of these readers/writers through the RST terminal. In other words, the IC card 1 must be always surely brought into a reset state before starting operation. Up to now, however, the supply sequence of the reset signal depends on reliability of the reader/writer, and the IC card 1 has no ability to deal with troubles in the resetting.

Meanwhile, in the conventional non-contact type IC card 11, particularly in a non-contact type IC card 11 which is mass-produced at the present, it is customary that the card is entirely enclosed to increase security and ensure water resistance, etc. and hence the built-in battery 20 cannot be replaced with new one. This means that the service life of the battery 20 incorporated in the card determines the service life of the card itself. In the non-contact type IC card whose price is much higher than that of magnetic stripe cards in widespread use at the present, therefore, it is desired to keep consumption of the battery 20 as small as possible and to prolong the service life of the card. Also, because of the battery 20 is enclosed, the oscillator 15 in the card continues oscillating and the battery 20 continues consuming the electric power stored therein after the battery has been mounted during the manufacture step. There is a considerable period of time from the manufacture of the non-contact type IC card 11 to actual use thereof by the card user in many cases, raising a problem of shortening the effective period in which the card can be used.

SUMMARY OF THE INVENTION

With a view of solving the above-described problems, an object of the present invention is to provide a contact type portable device with which an input sequence of a reset signal can be reliably performed.

Another object of the present invention is to provide a non-contact type portable device which can suppress consumption of a battery.

A contact type IC card according to the present invention comprises a power supply terminal, a reset terminal and an input/output terminal which for connection to an external device, an input/output circuit for receiving and delivering data from and to the external device through the input/output terminal, a data processing circuit connected to the input/output circuit for processing data, a memory circuit connected to the data processing circuit for storing data, and an internal reset signal generator for latching a predetermined potential when source power is applied from the external device through the power supply terminal, generating an internal reset signal by using the latched potential to bring the circuits into reset states, and stopping the generation of the internal reset signal to release the circuits from the reset states when a reset release signal is input from the external device through the reset terminal.

A non-contact type IC card according to the present invention comprises a transmitting/receiving circuit for transmitting and receiving data to and from an external device in a non-contact manner, a data processing circuit connected to the transmitting/receiving circuit for processing data, a memory circuit connected to the data processing circuit for storing data, a battery for supplying source power to the circuits, and oscillation means for latching a predetermined potential upon supply of the source power from the battery, stopping oscillation of a clock signal by using the latched potential, and starting the oscillation of a clock signal to supply the clock signal to the data processing circuit when a trigger signal is received from the external device through the transmitting/receiving circuit.

DESCRIPTION OF THE PREFERRED EMBODIMENTS

Hereinafter, embodiments of the present invention will be described with reference to the accompanying drawings. Embodiment 1.

Figure 1:
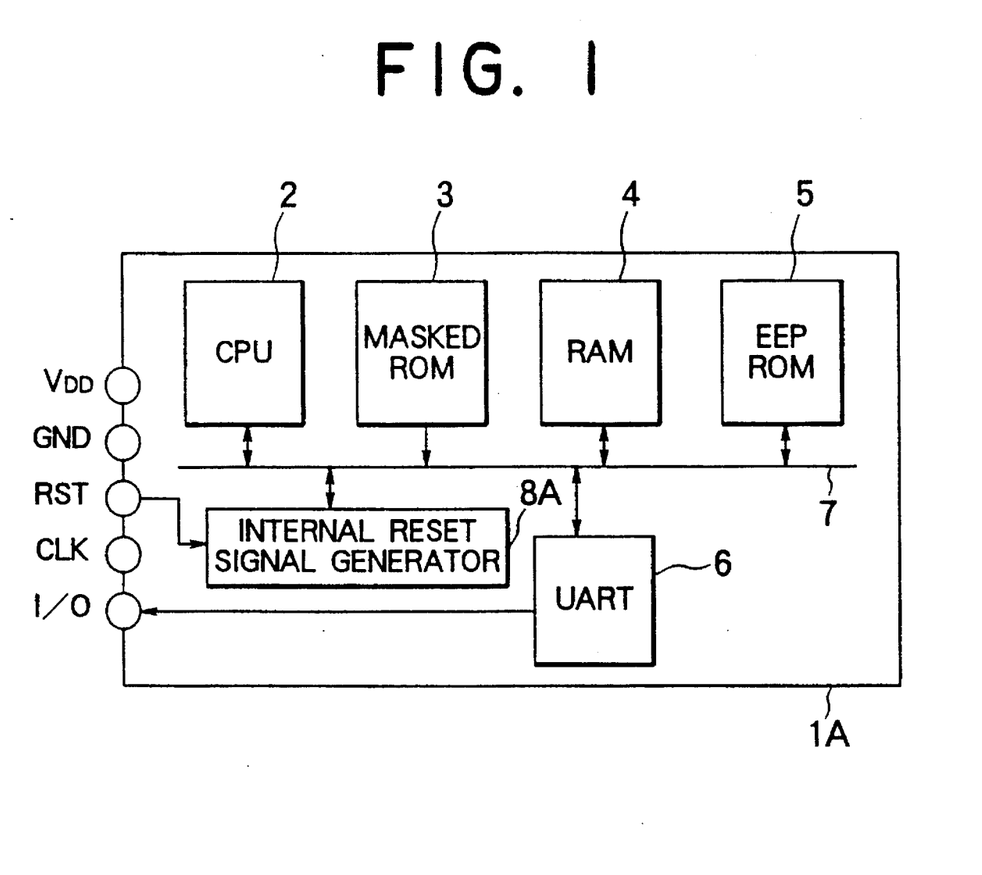
FIG. 1 is a diagram of a contact type portable device according to Embodiment 1 of the present invention.

FIG. 1 shows the configuration of a contact type IC card 1A according to Embodiment 1. The IC card 1A comprises a CPU 2 serving as a data processing circuit, and a masked ROM 3, a RAM 4, an EEPROM 5, a UART 6 and an internal reset signal generator 8A which are connected to the CPU 2 through a bus 7. The RAM 4 and the EEPROM 5 jointly make up a memory circuit in the present invention, and the UART 6 makes up an input/output circuit. The IC card 1A has five terminals, i.e., $V_{DD}$, GND, RST, CLK and I/O terminals, for connection to an external device such as a reader/writer. The internal reset signal generator 8A is connected to the RST terminal, and the UART 6 is connected to the I/O terminal.

Figure 2:
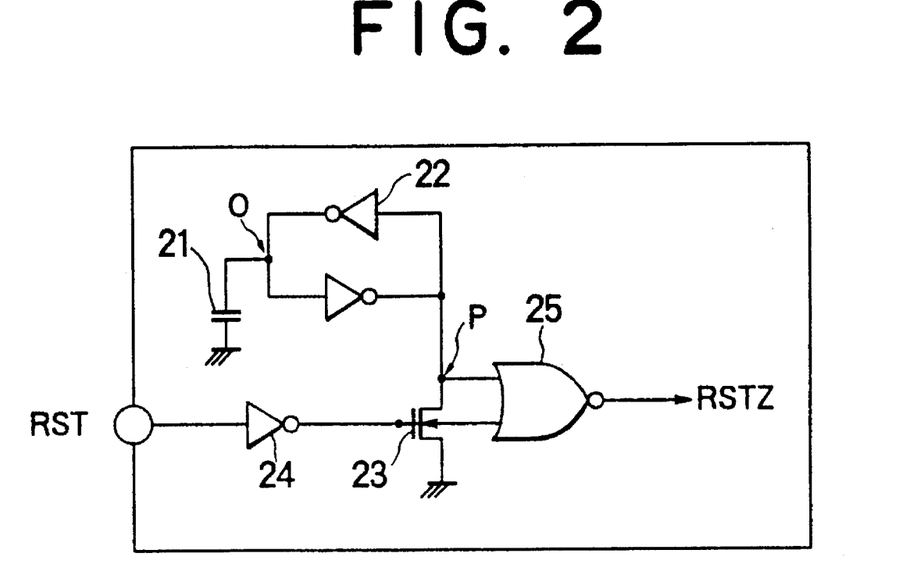
FIG. 2 is a logic circuit diagram of an internal reset signal generator for use in Embodiment 1.

As shown in FIG. 2, the internal reset signal generator 8A comprises a capacitor 21 grounded at its one terminal and a latch 22 connected to the other terminal 0 of the capacitor 21, an output terminal P of the latch 22 being grounded through an N-channel transistor 23. A gate of the transistor 23 is connected to the RST terminal through an inverter 24. Also, connected to the output terminal P of the latch 22 and the gate of the transistor 23 is a NOR gate 25 having a output terminal serving as an output terminal of the internal reset signal generator 8A. The capacitor 21 and the transistor 23 are designed so that a load capacitance Cp at a point P due to the transistor 23 is about 10 to 100 times the load capacitance Co of the capacitor 21. Further, a value of the load capacitance Co of the capacitor 21 is determined so that the point 0 takes an L level when the transistor 23 is in an off-state upon application of the source power.

Figure 3:
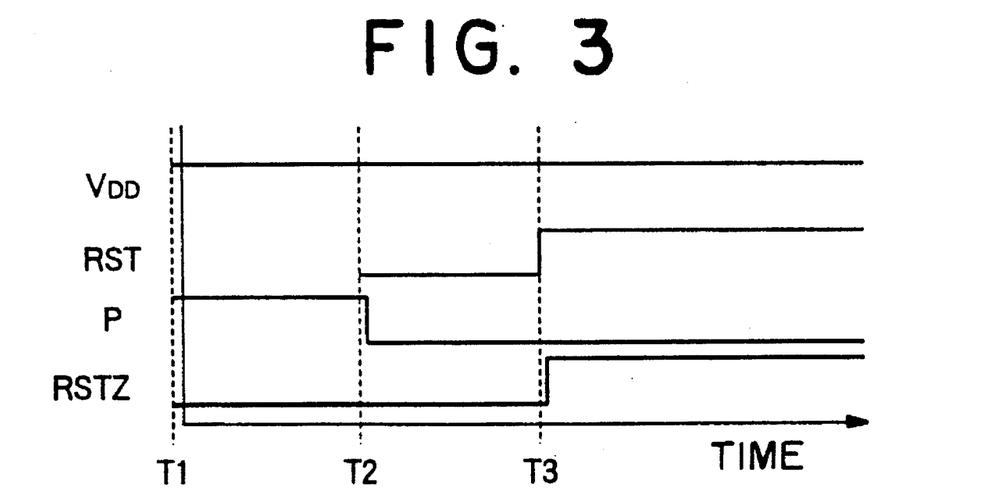
FIG. 3 is a timing chart showing operation of the internal reset signal generator of FIG. 2.

The start-up operation of the IC card 1A will now be described with reference to a timing chart of FIG. 3. When the IC card 1A are set in a reader/writer (not shown), $V_{DD}$ and GND voltages is first supplied at time T1 from the reader/writer to the IC card through the $V_{DD}$ and GND terminals, respectively. In response to the supply of the $V_{DD}$ and GND voltages, the capacitor 21 of the internal reset signal generator 8A, shown in FIG. 2, causes the input terminal 0 of the latch 22 to be lowered to an L level and the output terminal P thereof to take an H level, whereupon the latch 22 latches the data. With the point P taking an H level, an internal reset signal RSTZ at an L level is output from the NOR gate 25. The internal reset signal RSTZ is supplied to the other circuits in the IC card 1A through the bus 7, whereupon these circuits in the IC card 1A are brought into reset states.

In other words, when the source power is supplied from the reader/writer through the $V_{DD}$ and GND terminals as power supply terminals, the interior of the IC card 1A is set to a reset state.

When a reset signal at an L level is input to the internal reset signal generator 8A from the reader/writer through the RST terminal at time T2 under the above condition where the interior of the IC card 1A is in the reset state, the reset signal is inverted to an H level by the inverter 24 and then applied to the gate of the transistor 23 so that the transistor 23 is turned on. Therefore, the output terminal P of the latch 22 is lowered to an L level, whereupon the input terminal 0 of the latch 22 takes an H level to latch the data. At this time, although the point P turns to an L level, the output of the inverter 24 is at an H level and, therefore, the internal reset signal RSTZ output from the NOR gate 25 remains at the same L level for holding the reset state in the IC card 1A. Also, under this condition, a clock signal is started and supplied from the reader/writer through the CLK terminal.

When the reset signal input to the RST terminal turns to an H level at time T3, both inputs of the NOR gate 25 take an L level and hence the internal reset signal RSTZ output from the NOR gate 25 turns to an H level, whereupon the reset states of the circuits in the IC card 1A are released.

The operation of data transfer to and from an external device and data processing is carried out in the same manner as in the conventional IC card shown in FIG. 16. Specifically, when serial data is input through the I/O terminal, the data is subject to serial/parallel conversion in the UART 6, and then taken into the CPU 2 through the bus 7. The CPU 2 processes the data in accordance with the processing program loaded in the masked ROM 3 beforehand, loads the data, which is required to be stored temporarily, in the RAM 4, and loads the data, which is required to be stored for a long period of time, in the EEPROM 5. The data which is output is subject to parallel/serial conversion in the UART 6, and then transferred through the I/O terminal in series.

Embodiment 2.

Figure 4:
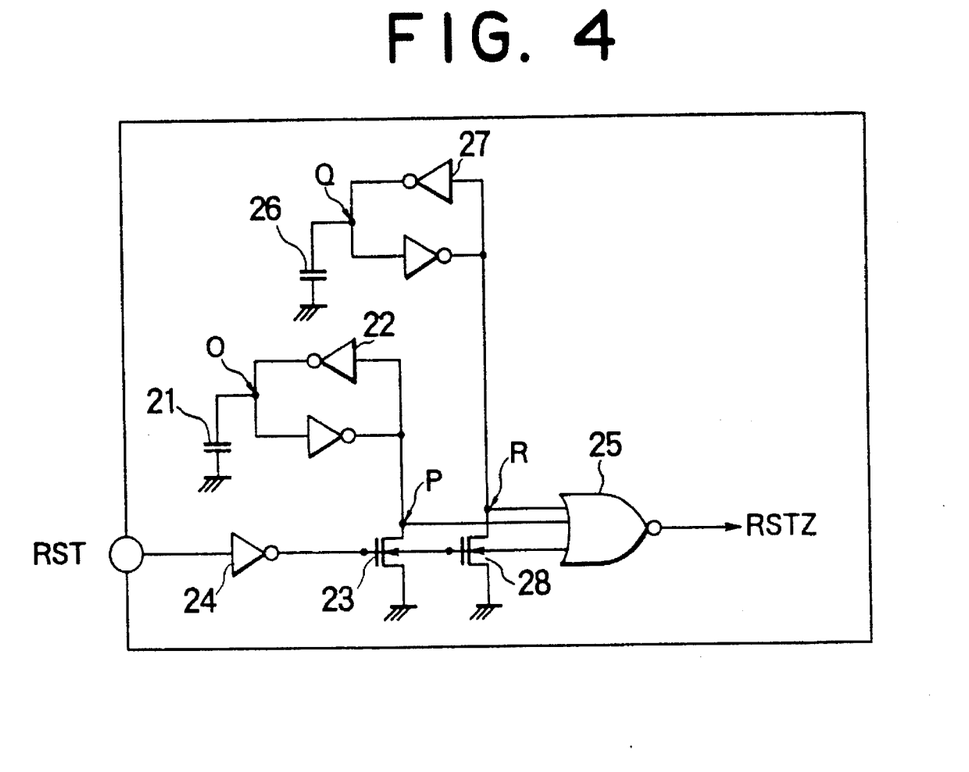
FIG. 4 is a logic circuit diagram of an internal reset signal generator for use in a contact type IC card according to Embodiment 2.

An internal reset signal generator shown in FIG. 4 may be employed instead of the internal reset signal generator 8A in Embodiment 1. Besides the configuration of the internal reset signal generator 8A in Embodiment 1 shown in FIG. 2, the internal reset signal generator of this embodiment further comprises a capacitor 26 grounded at one of its terminals, a latch 27 connected to the other terminal Q of the capacitor 26, and an N-channel transistor 28 connected to an output terminal R of the latch 27, the output terminal R of the latch 27 being connected to the NOR gate 25. Additionally, the gate of the transistor 23 is connected to a gate of the transistor 28.

While the transistor 28 is designed so as to provide a load capacitance at the point R that is equal to the load capacitance at the point P due to the transistor 23, the capacitor 26 is designed so as to have a load capacitance Cq different from the load capacitance Co of the capacitor 21. Thus, in Embodiment 2, a serial circuit comprising a capacitor and a latch is provided in two stages, and the two capacitors have different values of load capacitance from each other. As described in connection with Embodiment 1, the value of the load capacitance Co of the capacitor 21 is restricted by the load capacitance Cp at the point P due to the transistor 23, and also must be determined so that the point 0 takes an L level upon application of the source power. Accordingly, the load capacitance Co of the capacitor 21 has an accompanying difficulty in circuit design. In Embodiment 2, therefore, plural values of load capacitance are prepared to more surely bring the interior of the IC card into a reset state upon application of the source power.

The operation of Embodiment 2 will now be described. First, the source power is supplied to the IC card at time T1 in FIG. 5 for starting supply of $V_{DD}$ and GND voltages to the internal circuits. Correspondingly, the load capacitances Co and Cq of the capacitors 21 and 26 function to lower the input terminals 0 and Q of the latches 22 and 27 to an L level. Depending on conditions such as values of the load capacitances and a value of the source power voltage, however, the points 0 and Q are sometimes not fully lowered to an L level. A description will be made of the case where the point 0 does not turn to an L level, but only the point Q turns to an L level because of the relationship of Co<Cq between the load capacitance Co of the capacitor 21 and the load capacitance Cq of the capacitor 26.

Figure 5:
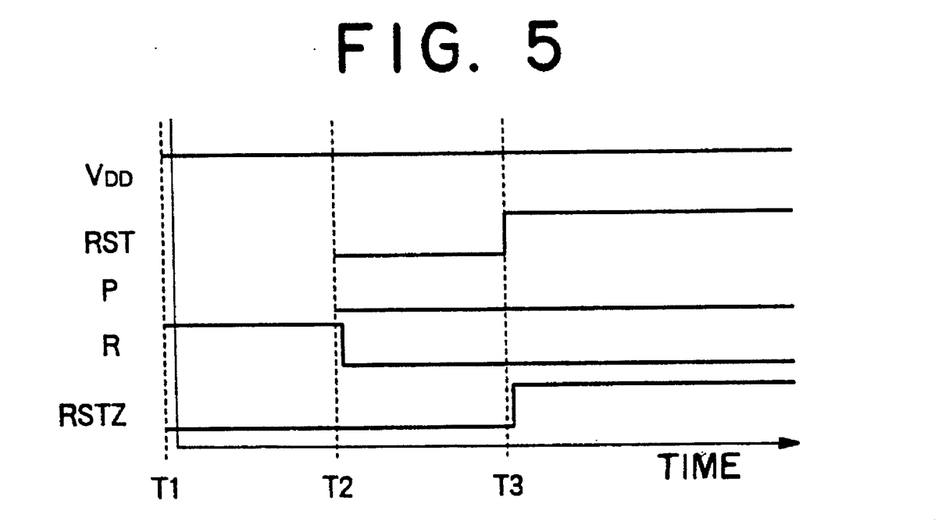
FIG. 5 is a timing chart showing operation of the internal reset signal generator of FIG. 4.

After application of the source power, the input terminal 0 of the latch 22 is not fully lowered to an L level and the output terminal F thereof comes into an uncertain state. However, since the input terminal Q of the latch 27 is lowered to an L level, the output terminal R thereof takes an H level, whereupon an internal reset signal RSTZ at an L level is output from the NOR gate 25 for bringing the IC card into a reset state. Then, when a reset signal at an L level is input to the RST terminal at time T2, the transistors 23 and 28 are Both turned on and the points P and R are both turned to an L level, causing the latches 22 and 27 to latch the respective data at the points P and Q. After that, when the reset signal turns to an H level at time T3, the internal reset signal RSTZ output from the NOR gate 25 turns to an H level, whereupon the reset state of the interior of in the IC card is released.

By providing multiple stages of capacitors different in load capacitance from each other as described above, the interior of the IC card can be more reliably brought into a reset state upon application of the source power. Note that while a serial circuit comprising a capacitor and a latch is provided in two stages in Embodiment 2, the number of stages is not limited to two and the serial circuit may be provided in three stages.

Embodiment 3.

Figure 6:
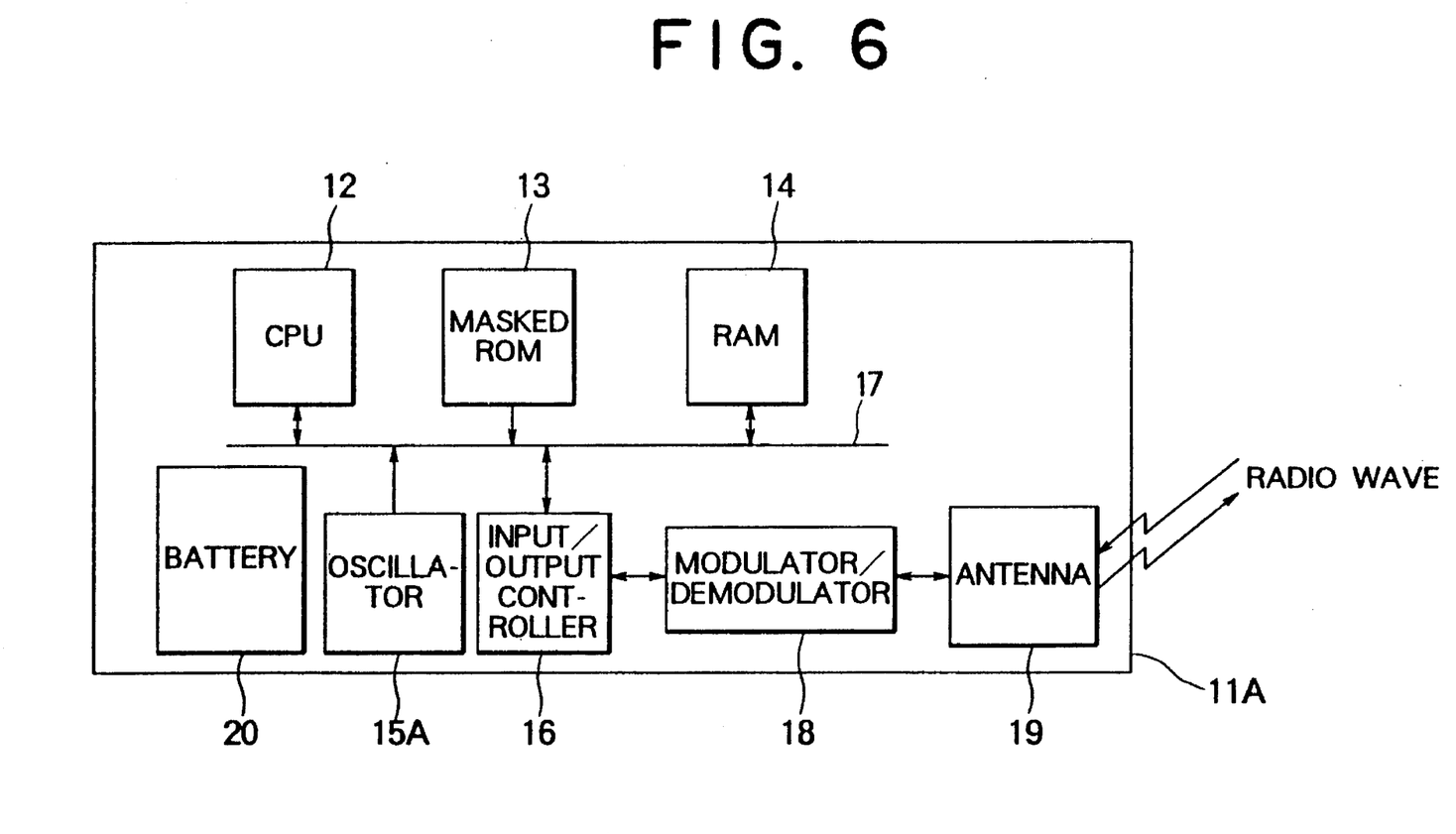
FIG. 6 is a block diagram of a contact type portable device according to Embodiment 3.

FIG. 6 shows the configuration of a non-contact type IC card 11A according to Embodiment 3. The IC card 11A comprises a CPU 12 serving as a data processing circuit, and a masked ROM 13, a RAM 14 as a memory circuit, an oscillator 15A and an input/output controller 16 which are connected to the CPU 12 through a bus 17, with an antenna 19 connected to the input/output controller 16 through a modulator/demodulator 18. Also, a battery 20 as a power supply is built into the IC card 11A. Incidentally, the CPU 12, the masked ROM 13, the RAM 14, the oscillator 15A, the input/output controller 16, the bus 17 and the modulator/demodulator 18 are in a single IC chip which makes up a microcomputer.

Figure 7:
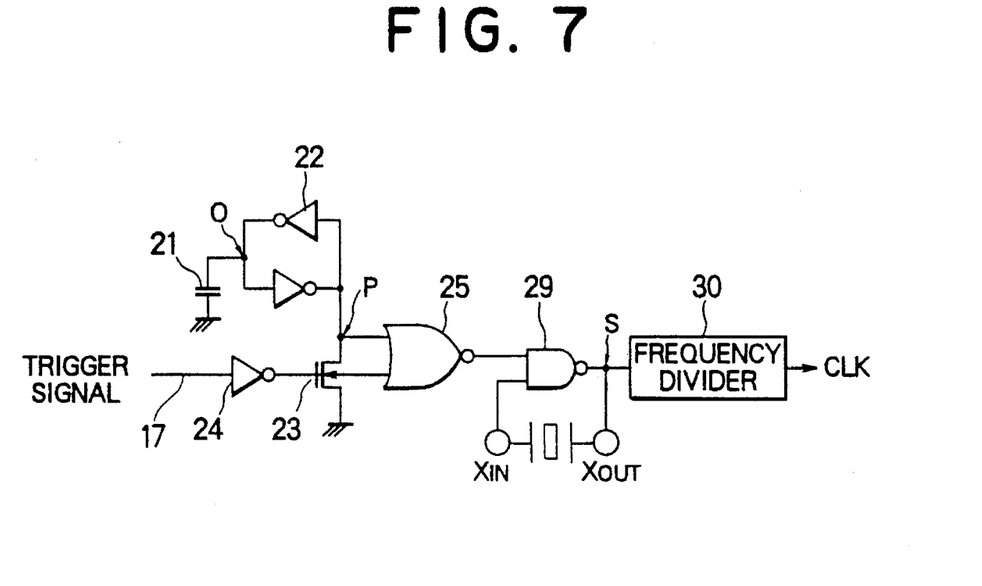
FIG. 7 is a logic circuit diagram of an oscillator for use in Embodiment 3.

As shown in FIG. 7, the oscillator 15A comprises a capacitor 21 grounded at one of its terminals and a latch 22 connected to the other terminal 0 of the capacitor 21, an output terminal P of the latch 22 being grounded through an N-channel transistor 23. A gate of the transistor 23 is connected to the bus 17 through an inverter 24. Also, a NOR gate 25 is connected to the output terminal P of the latch 22 and the gate of the transistor 23, and a frequency divider 30 is connected to an output terminal of the NOR gate 25 through a NAND gate 29. An oscillator crystal 31 is connected between input and output terminals of the NAND gate 29. As with Embodiment 1, the capacitor 21 and transistor 23 are designed so that a load capacitance Cp at a point P due to the transistor 23 is about 10 to 100 times the load capacitance Co of the capacitor 21. Further, the load capacitance Co of he capacitor 21 is determined so that the point 0 takes an L level when the transistor 23 is in an off-state and the source power is supplied.

Figure 8:
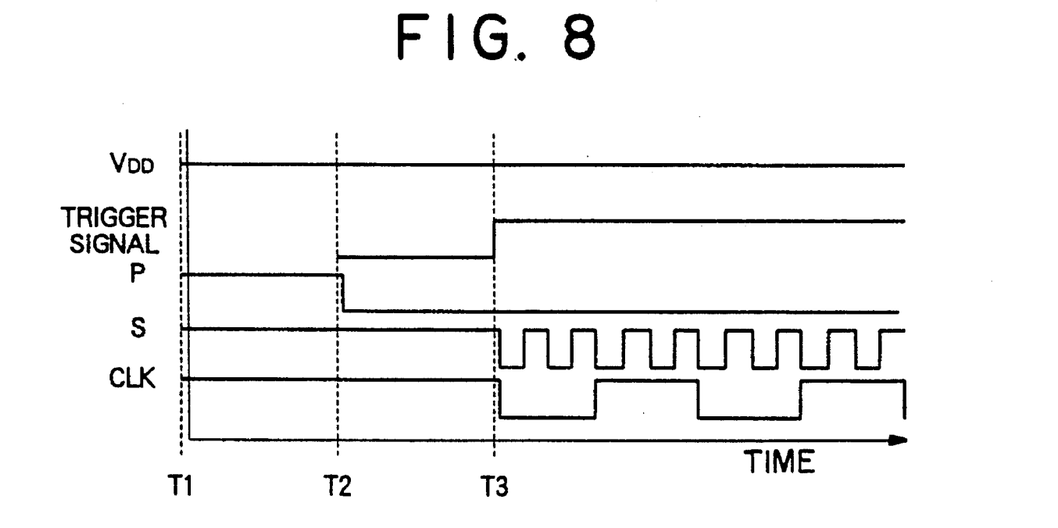
FIG. 8 is a timing chart showing operation of the oscillator of FIG. 7.

In this non-contact type IC card 11A, when the battery 20 is mounted in the card at the shown in FIG. 8, to supply electrical power to the oscillator 15A, the load capacitance Co of the capacitor 21 causes the output terminal P of the latch 22 to take an H level, whereupon an L-level signal is output from the NOR gate 25 to the NAND gate 29 and hence an output terminal S of the NAND gate 29 is fixed to an H level. Thus, oscillation of a clock signal from the oscillator crystal 31 is stopped and, as a result, consumption of the battery 20 is suppressed.

Then, when a trigger signal at an L level is received by the IC card 11A at time T2 from an external device through the antenna 19, the trigger signal is applied to the oscillator 15A through the modulator/demodulator 18, the input/output controller 16 and the bus 17, whereupon the transistor 23 is turned on to lower the point P to an L level. At this time, since the trigger signal, which has been inverted to an H level by the inverter 24, is input to the NOR gate 25, the output terminal S of the NAND gate 29 still remains fixed to an H level and the oscillation of the clock signal also remains stopped.

When the trigger signal turns to an H level at time T3, an H-level signal is input from the NOR gate 25 to the NAND gate 29, whereupon the level at the output terminal S of the NAND gate 29 is released from its fixed state, causing the oscillator crystal 31 to start oscillation and generation of the clock signal. The clock signal appearing at the point S is subject to frequency division by the frequency divider 30 and is then supplied as an internal clock signal CLK to the other circuits in the IC card 11A. The remaining basic operation of the IC card 11A is the same as that of the conventional IC card 11 shown in FIG. 18.

According to Embodiment 3, even after the battery 20 bas been mounted in the non-contact type IC card 11A during the manufacturing, oscillation of a clock signal can be kept stopped to suppress consumption of the battery. When a trigger signal is once applied to the card from an external device at the time of starting actual use of the card, the oscillation of a clock signal is started to achieve the same function as that of the conventional card.

Embodiment 4.

Figure 9:
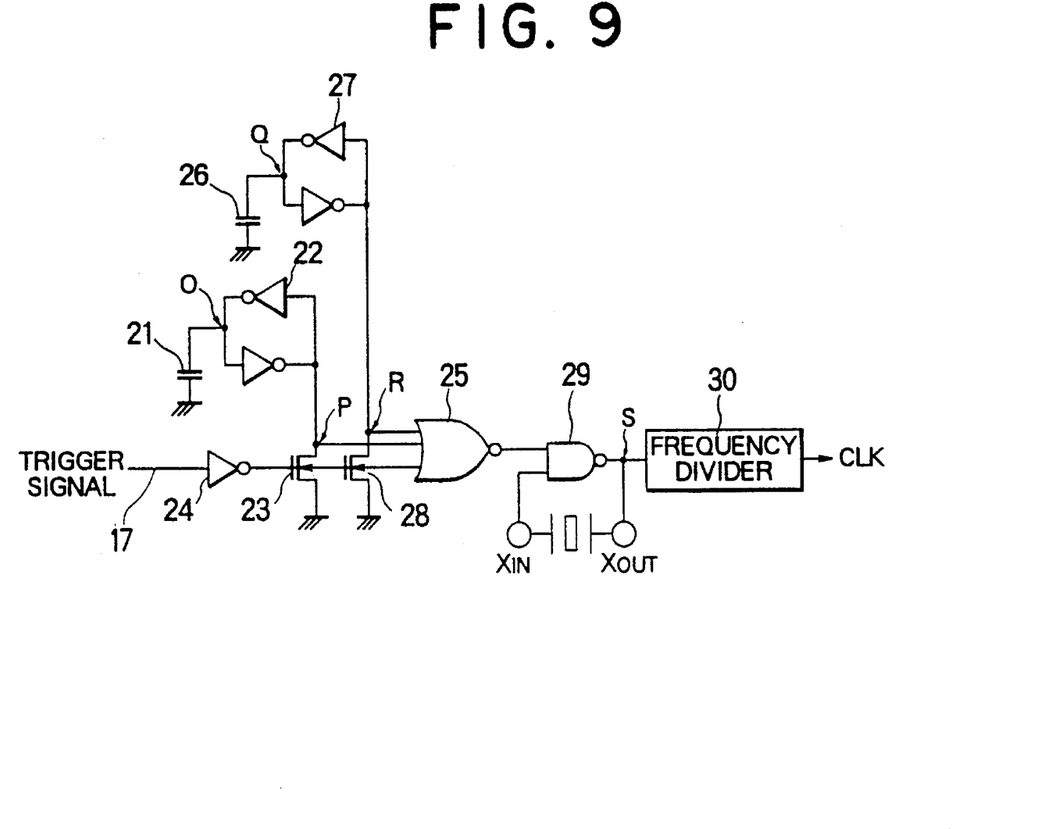
FIG. 9 is a logic circuit diagram of an oscillator for use in a non-contact type IC card according to Embodiment 4.

As with the contact type IC card of Embodiment 2, a serial circuit comprising a capacitor and a latch can also be provided in multiple stages in the non-contact type IC card. As shown in FIG. 9, besides the configuration of the non-contact type IC card of Embodiment 3, the card of Embodiment 4 further comprises a capacitor 26, a latch 27 and a transistor 28 so that a serial circuit comprising a capacitor and a latch is provided in two stages.

Figure 10:
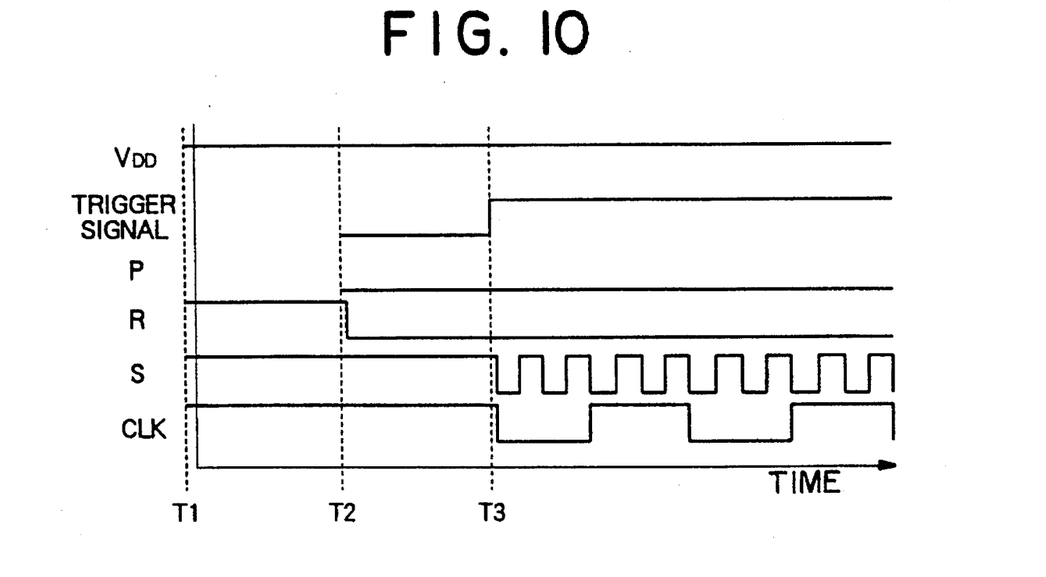
FIG. 10 is a timing chart showing operation of the oscillator of FIG. 9.

When the battery 20 is mounted in the IC card at time T1 shown in FIG. 10, the load capacitances Co and Cq of the capacitors 21 and 26 function to lower the input terminals 0 and Q of the latches 22 and 27 to an L level. Depending on conditions, such as values of the load capacitances and a value of the source power voltage, however, the points 0 and Q are sometimes not fully lowered to an L level. A description will be made of the case where the point 0 does not turn to an L level, but only the point Q turns to an L level because of the relationship of Co<Cq between the load capacitance Co of the capacitor 21 and the load capacitance Cq of the capacitor 26.

After the battery 20 has been mounted in place, even if the input terminal 0 of one latch 22 is not fully lowered to an L level and the output terminal P thereof comes into an uncertain state, the output terminal S of the NAND gate 29 is fixed to an H level because the output terminal R of the other latch 27 turns to an H level and an L-level signal is output from the NOR gate 25 to the NAND gate 29. Then, when a trigger signal at an L level is applied to the IC card at time T2 from an external device, the transistors 23 and 28 are both turned on to lower both the points P and R to an L level. Further, when the trigger signal turns to an H level at time T3, the level at the output terminal S of the NAND gate 29 is released from its fixed state. Thus, the oscillator crystal 31 starts oscillation and generation of a clock signal. The clock signal is subject to frequency division by the frequency divider 30 and then supplied as an internal clock signal CLK to the other circuits in the IC card.

Embodiment 5.

Figure 11:
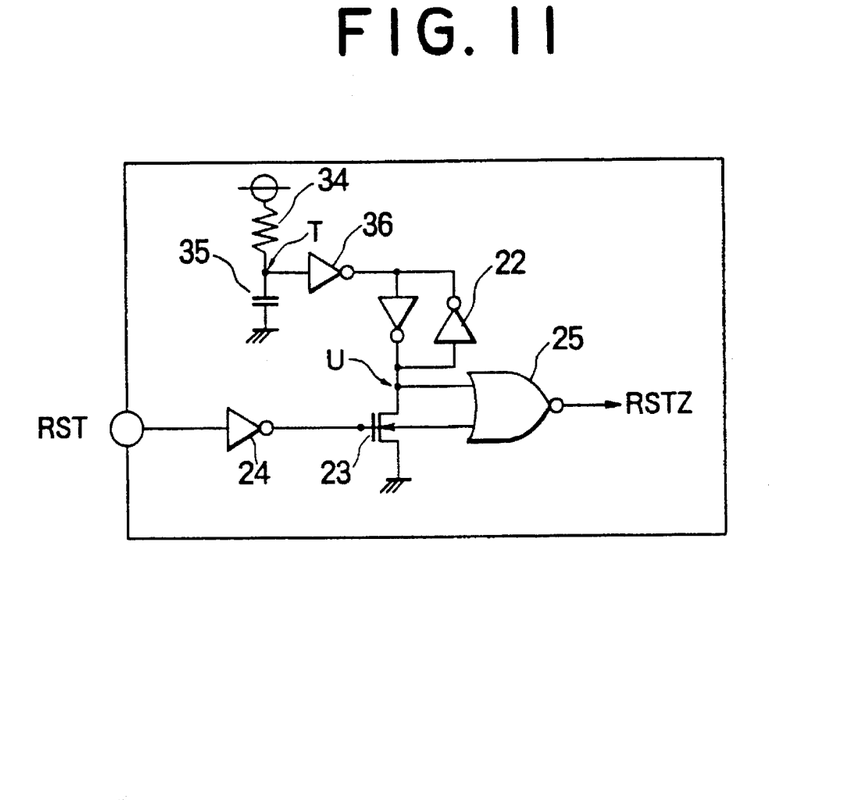
FIG. 11 is a logic circuit diagram of an internal reset signal generator for use in a contact type IC card according to Embodiment 5.

While the capacitor 21 is employed in Embodiment 1 to turn the output terminal P of the latch 22 to an H level upon application of the source power, a pull-up resistor may be used instead of the capacitor. FIG. 11 shows a logic circuit diagram of an internal reset signal generator for use in a contact type IC card according to Embodiment 5. The internal reset signal generator of this embodiment is different from the internal reset signal generator 8A of Embodiment 1 shown in FIG. 2 in that, instead of the capacitor 21, a pull-up resistor 34 connected at one terminal to a source power line and an inverter 36 connected to the other terminal of the pull-up resistor 34 are connected to the input terminal of the latch 22. Additionally, the other terminal of the pull-up resistor 34 is grounded through a protective capacitor 35.

Figure 12:
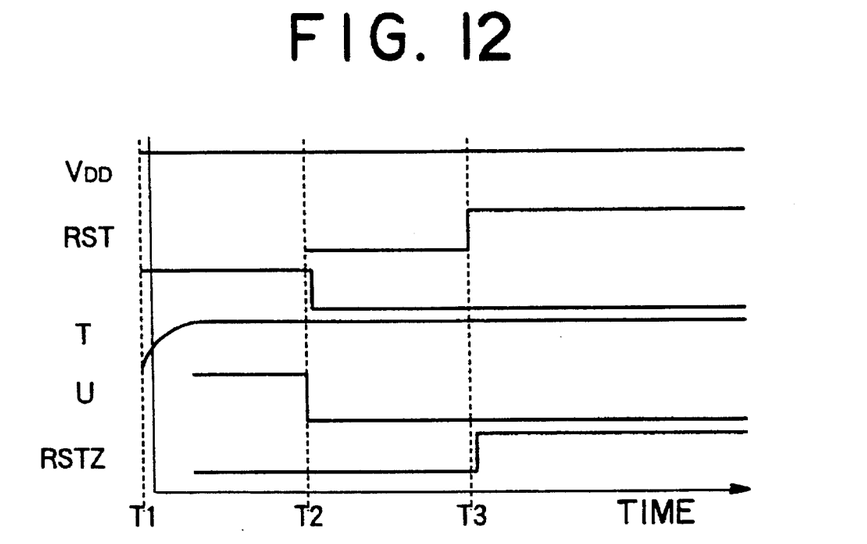
FIG. 12 is a timing chart showing operation of the internal reset signal generator of FIG. 11.

The operation of Embodiment 5 will now be described with reference to a timing chart of FIG. 12. When the source power is applied at time T1 through the $V_{DD}$ and GND terminals, the pull-up resistor 34 and the pulled-down protective capacitor 35 function to gradually raise a junction T between the resistor 34 and the capacitor 35 to an H level. Correspondingly, an output terminal U of the latch 22 is also raised to an H level, whereupon an internal reset signal RSTZ at an L level is output from the NOR gate 25 for bringing the other circuits in the IC card into reset states. Then, when a reset signal at an L level is input at time T2 through the RST terminal, the transistor 23 is turned on to lower the point U to an L level. Further, when the reset signal turns to an H level at time T3, the internal reset signal RSTZ takes an H level so that the IC card is released from the reset state.

Embodiment 6.

Figure 13:
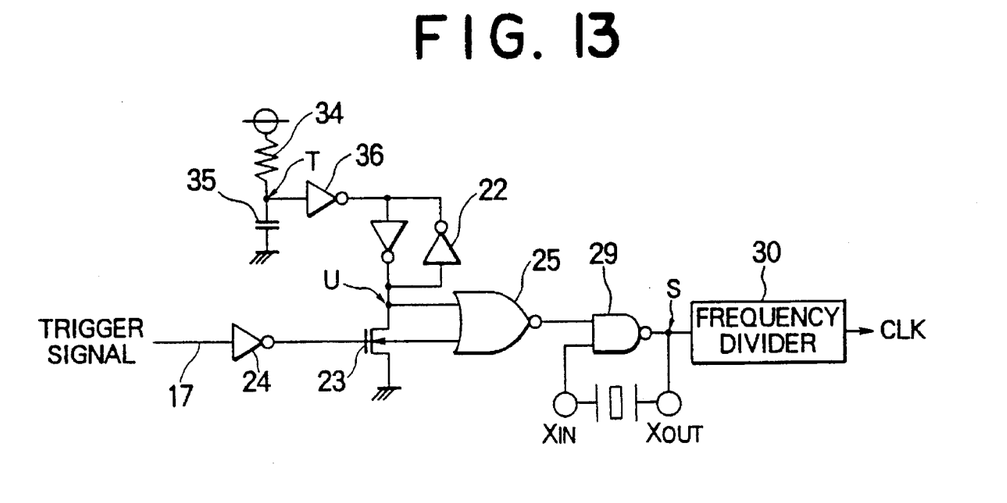
FIG. 13 is a logic circuit diagram of an oscillator for use in a non-contact type IC card according to Embodiment 6.

FIG. 13 shows a logic circuit diagram of an oscillator for use in a non-contact type IC card according to Embodiment 6. The oscillator of this embodiment is different from the oscillator of Embodiment 3 shown in FIG. 7 in that, instead of the capacitor 21, a pull-up resistor 34 connected at one terminal to a source power line and an inverter 36 connected to the other terminal of the pull-up resistor 34 are connected to the input terminal of the latch 22. Additionally, the other terminal of the pull-up resistor 34 is grounded through a protective capacitor 35.

Figure 14:
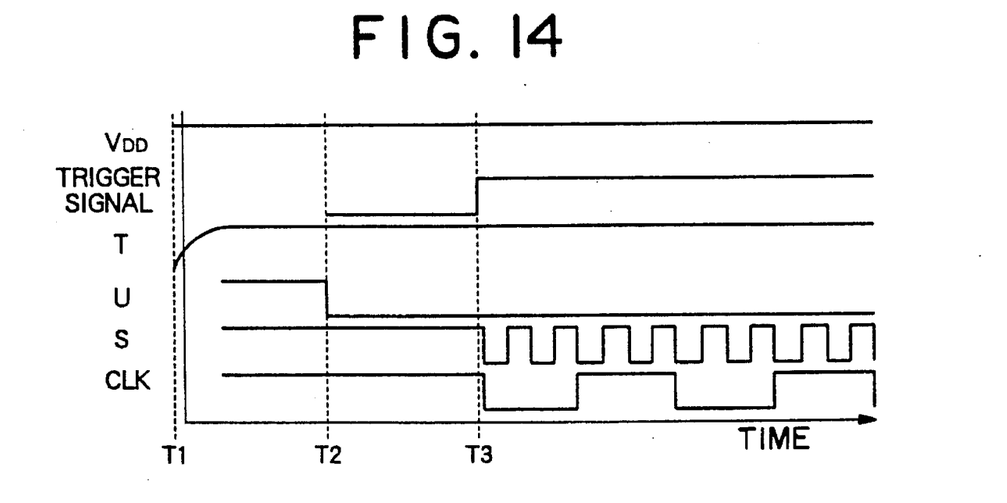
FIG. 14 is a timing chart showing operation of the oscillator of FIG. 13.

Referring to a timing chart of FIG. 14, when a battery is mounted in the IC card at T1 to supply electric power to the oscillator, the pull-up resistor 34 and the pulled-down protective capacitor 35 function to gradually raise a junction T between the resistor 34 and the capacitor 35 to an H level. Correspondingly, an output terminal U of the latch 22 is also raised to an H level, whereupon an L-level signal is output from the NOR gate 25 and the output terminal S of the NAND gate 29 is fixed to an H level. This condition is kept until a trigger signal is received from an external device. Then, when a trigger signal at an L level is applied to the IC card at time T2 from an external device, the transistor 23 is turned on to lower the point U to an L level. Further, when the trigger signal turns to an H level at time T3, the level at the output terminal S of the NAND gate 29 is released from its fixed state, and the oscillator crystal 31 starts oscillation of a clock signal. The clock signal appearing at the point S is subject to frequency division by the frequency divider 30 and then supplied as an internal clock signal CLK to the other circuits in the IC card.

Embodiment 7.

Figure 15:
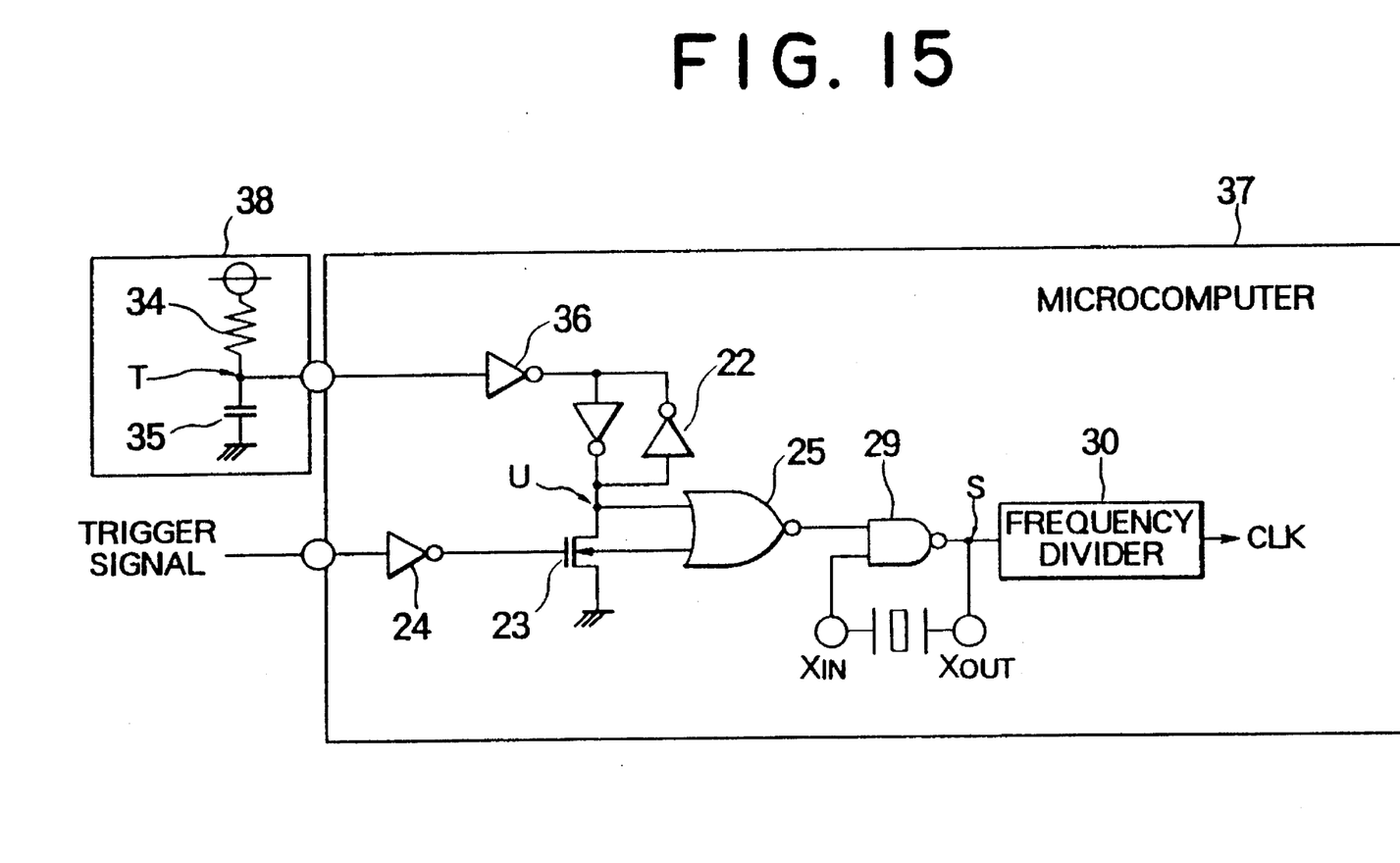
FIG. 15 is a logic circuit diagram of a primary part of a non-contact type IC card according to Embodiment 7.

As mentioned above in connection with Embodiment 3, the CPU 12, the masked ROM 13, the RAM 14, the oscillator 15A, the input/output controller 16, the bus 17 and the modulator/demodulator 18 are a single IC chip which makes up a microcomputer. As shown in FIG. 15, however, the pull-up resistor 34 and the protective capacitor 35 may be an element 38 separate from the chip 37 making up a microcomputer. More specifically, in Embodiment 7, the element 38 comprising the pull-up resistor 34 and the protective capacitor 35 is externally attached to the microcomputer chip 37 within the IC card.

In Embodiment 6, the pull-up resistor 34 and the pulled-down protective capacitor 35, which stop oscillation of the internal clock signal, are provided in the oscillator. But when the pull-up resistor 34 and the capacitor 35 are incorporated in the microcomputer chip along with the oscillator, the resistance value and the load capacitance value are fixed and a change or variations in characteristics of the source power voltage for operating the microcomputer often cannot be properly dealt with. By independently mounting the pull-up resistor 34 and the protective capacitor 35 as the element 38 external of the microcomputer chip 37, as in Embodiment 7, it is possible to mount a resistor and capacitor to having values that are most effective in matching with characteristics of the microcomputer during card design, and hence to flexibly deal with various conditions. As a result, the oscillation of a clock signal in the microcomputer can be stopped with higher reliability. Note that the circuits operate in the same manner as in Embodiment 6.

What is claimed is:

1. A non-contact IC card comprising:

a transmitting/receiving circuit for transmitting data to and receiving data from an external device without direct contact, a data processing circuit connected to said transmitting/receiving circuit for processing data, a memory circuit connected to said data processing circuit for storing data, a battery for supplying source power to said transmitting/receiving and data processing circuits, and oscillation means for latching a predetermined potential when the source power is supplied from said battery, for stopping oscillation of said oscillation means by using the latched potential, and for starting oscillation of said oscillation means to supply a clock signal to said data processing circuit when a trigger signal is received from the external device through said transmitting/receiving circuit.

2. The non-contact IC card according to claim 1 wherein said oscillation means includes a first capacitor grounded at a first terminal and a first latch connected to a second terminal of said first capacitor.

3. The non-contact IC card according to claim 2 wherein said oscillation means includes a second capacitor grounded at a first terminal and having a load capacitance value different from said first capacitor and a second latch connected to a second terminal of said second capacitor.

4. The non-contact IC card according to claim 1 wherein said oscillation means includes a pull-up resistor connected at a first terminal to said battery and a latch connected to a second terminal of said pull-up resistor.

5. The non-contact IC card according to claim 1 wherein said oscillation means comprises a pull-up resistor connected at a first terminal to said battery and an oscillation circuit including a latch connected to a second terminal of said pull-up resistor wherein said transmitting/receiving circuit, said data processing circuit, said memory circuit, and said oscillation circuit are parts of a single chip and said pull-up resistor is separate from said chip.

* * * * *